United States Patent [19]

Daugny

[11] Patent Number: 4,614,631

[45] Date of Patent: Sep. 30, 1986

[54] PROCESS FOR SCREW-CUTTING IN A TUBE OR LINK MADE FROM A COMPOSITE CARBON FIBER BASED MATERIAL COATED WITH POLYMERIZED RESIN

[75] Inventor: Daniel Daugny, Tournon-sur-Rhone, France

[73] Assignee: Societe Financiere & Immobiliere SKF et Cie, St. Vallier, France

[21] Appl. No.: 672,873

[22] Filed: Nov. 19, 1984

[30] Foreign Application Priority Data

Nov. 18, 1983 [FR] France .................. 83 18686

[51] Int. Cl.⁴ .............................. B29C 35/02
[52] U.S. Cl. .................... 264/258; 264/137; 264/269; 264/308; 264/314; 264/318; 264/324
[58] Field of Search ............ 264/308, 314, 318, 324, 264/137, 258, 269

[56] References Cited

U.S. PATENT DOCUMENTS

| | | | |
|---|---|---|---|
| 2,710,026 | 6/1955 | Stewart et al. | 264/312 |
| 3,579,400 | 5/1971 | Kanyok et al. | 264/314 |
| 3,937,781 | 2/1976 | Allen | 264/314 |
| 4,126,659 | 11/1978 | Blad | 264/137 X |
| 4,187,271 | 2/1980 | Rolston et al. | 264/258 |

*Primary Examiner*—Donald Czaja
*Assistant Examiner*—Harold Pyon
*Attorney, Agent, or Firm*—Young & Thompson

[57] ABSTRACT

In this process for forming an internal screw thread in a tube or link made from a composite carbon fiber based material coated with polymerized resin, the part of the tube or link comprising the screw thread is inserted in the body of the tube or the link and molded on a threaded mandrel. This part of the tube or link where the screw thread is to be formed is polymerized substantially completely and under pressure on the threaded mandrel so as to obtain a preform comprising a hard internally threaded portion extended by non polymerized fibers; an expandable mandrel is introduced into this preform; the preform is inserted inside a tube which is already polymerized or to be cured; and finally polymerization under pressure of the fibers is provided by heating and causing the mandrel to expand so as to bond them to the fibers of the tube.

4 Claims, 5 Drawing Figures

PROCESS FOR SCREW-CUTTING IN A TUBE OR LINK MADE FROM A COMPOSITE CARBON FIBER BASED MATERIAL COATED WITH POLYMERIZED RESIN

BACKGROUND OF THE INVENTION

1. Field of the Invention

The present invention relates to a process for screw cutting in a tube or a link made from a composite carbon fiber based material coated with polymerized resin, in which the part of the tube or link comprising the screw thread is inserted in the body of the tube or link and molded on a threaded mandrel.

2. Description of the Prior Art

There exist at the present time tubes and links made from composite materials, for example resin impregnated carbon fibers. The uses thereof are numerous, in particular in the aeronautic field.

These tubes and links are often molded by disposing layers of fibers in a mold, on an inflatable mandrel formed by a bladder connectable to a pressurized fluid source. During curing of the resin, the bladder is inflated which presses the layers of fibers on the internal surface of the mold.

They generally comprise metal end elements bonded or riveted to the tube or assembled by shrink fit therewith.

Attempts have been made to provide tubes and links made from a composite material one of whose ends at least comprises a screw thread.

This result can be attained by molding the end of the tube on a threaded mandrel. Thus the U.S. Pat. No. 2,710,026 describes a process for manufacturing a tube made from a composite material, comprising an end with internal screw-thread, in which a first preform is inserted for receiving the screw thread and partially polymerized in a second preform intended to form the body of the tube and in which the assembly is disposed on a mandrel comprising a threaded portion engaged in the first preform then heated to the desired temperature. But experience shows that this process is not applicable to carbon fiber links or tubes for the fibers of the screw thread portion are not sufficiently compacted and the internal screw thread is not capable of transmitting the forces in the environmental conditions met with in aircraft. Moreover, an inflatable bladder cannot be disposed inside the tube and, after curing, it happens that this latter comprises wrinkled zones.

SUMMARY OF THE INVENTION

The present invention provides a process for forming an internal screw thread in a tube or link made from a composite carbon fiber based material which allows a very strong screw thread to be obtained and the tube or link to be molded on an expandable mandrel.

This process is characterized in that said part of the tube or link where the screw thread is to be formed is polymerized on the threaded mandrel substantially completely and under pressure so as to obtain a preform comprising a hard internally threaded portion extended by non polymerized fibers, in that an expandable mandrel is introduced into this preform, in that said preform is inserted inside a tube already polymerized or to be cured, and in that the polymerization under pressure of said fibers is finally provided by heating and causing said mandrel to expand, so as to bond them to the fibers of the tube.

BRIEF DESCRIPTION OF THE DRAWINGS

One embodiment of the process of the invention will be described hereafter, by way of non limitative example, with reference to the accompanying drawing in which.

DESCRIPTION OF THE PREFERRED EMBODIMENTS

Figure 1:
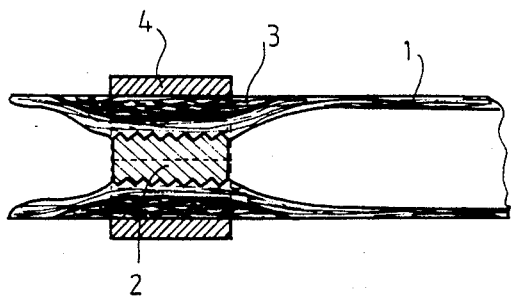
FIG. 1 shows in axial section the molding of the internally threaded portion.
Figure 2:
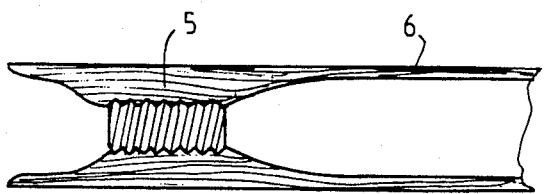
FIG. 2 is an axial sectional view showing the polymerized internally threaded portion and the non polymerized portions which extend it.
Figure 3:
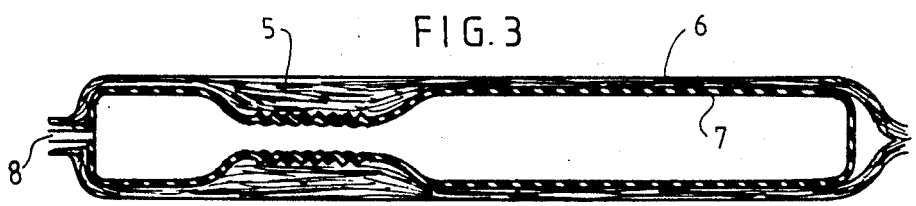
FIGS. 3 and 4 show in axial section the molding of the tube proper.

To form a composite tube having an internal screw thread, one or several layers, 1 of carbon fibers preimpregnated with resin are wound on a threaded mandrel 2 made from a material having a high thermal expansion coefficient, for example aluminium; the length of the mandrel is small with respect to that of the layers. The thickness of the layers may be reinforced at right angles to the mandrel by means of auxiliary layers or tissues 3 having the same length as the mandrel. Then a mold 3-4 made from a low thermal expansion coefficient material is disposed about mandrel 2, said mold being formed for example by two half shells; the mold is pressed and heated while maintaining the layers 1 stretched. The pressure exerted on the fibers is increased by the fact that mandrel 2 expands more than the external mold 4. The resin at right angles to the mandrel 2 is polymerized and cured. After curing, the mandrel 2 is withdrawn by unscrewing it; thus a preform is obtained comprising a hard internally threaded part 5 extended on each side by non polymerized fibers 6 (FIG. 2). This preform is fitted on an inflatable bladder 7 having a duct 8 for admission of a pressurized fluid (FIG. 3).

Figure 4:
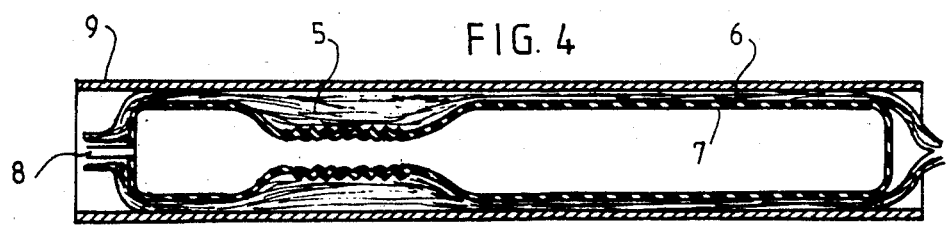

Then the assembly is fitted in an already polymerized tube 9 which forms the external mold, bladder 7 is inflated so as to press the preform against the tube and it is heated. The non polymerized fibers 6 are bonded to the fibers of tube 9 and the resin which impregnates them is polymerized (FIG. 4).

Figure 5:
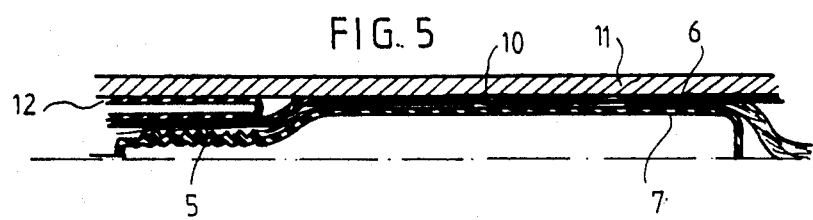
FIG. 5 is a half section of a detail of a variant.

On the preform and bladder 7 layers or tissues of non polymerized fibers 10 may also be disposed, as shown in FIG. 5, which are intended to form the body of the tube properly speaking and the whole can be placed in a metal mold 11. In this case, a mold can be used having a diameter greater than the outer diameter of the internally threaded portion 5 which is already polymerized and covered with layers 10, and a second annular bladder 12 can be interposed between layers 10 and the mold, at right angles to this portion 5. Thus a cylindrical tube is obtained whose internally threaded end has a reduced diameter.

It goes without saying that the present invention must not be considered as limited to the embodiment described and shown but on the contrary covers all variants thereof.

What is claimed is:

1. A process for forming an internal screw thread in a tube or link made from a composite carbon fiber based material coated with polymerized resin, in which the part of the tube or link comprising the screw thread is inserted in the body of the tube or the link and molded on a threaded mandrel, wherein said part of the tube or link where the screw thread is to be formed is polymerized substantially completely and under pressure on the threaded mandrel so as to obtain a preform comprising a hard internally threaded portion having non polymerized fibers extending lengthwise therefrom, an expandable mandrel is introduced into this preform, said preform is inserted inside a tube of fibers which is already polymerized or to be cured, and finally polymerization under pressure of said lengthwise extending fibers is provided by heating and causing the mandrel to expand so as to bond said lengthwise extending fibers to the fibers of the tube.

2. The process as claimed in claim 1, characterized in that one or more layers or tissues are wound on a threaded mandrel whose length is small with respect to that of the layers.

3. The process as claimed in claim 2, wherein the thickness of the layers of tissues at right angles to the mandrel is reinforced by layers or tissues having substantially the same length as the mandrel.

4. The process as claimed in claim 1, wherein layers or tissues of polymerized fibers are disposed on the internally threaded portion, the whole is fitted into a mold of a diameter larger than the outer diameter of the internally threaded portion coated with layers, and an annular bladder is interposed between the layers and the mold at right angles to said internally threaded portion.

* * * * *